United States Patent [19]

Rosthauser

[11] Patent Number: 4,522,851
[45] Date of Patent: Jun. 11, 1985

[54] PROCESS FOR COATING AQUEOUS DISPERSION OF EPOXY RESIN AND BLOCKED POLYISOCYANATE CONTAINING CHEMICALLY INCORPORATED ANIONIC HYDROPHILIC GROUPS

[75] Inventor: James W. Rosthauser, Imperial, Pa.

[73] Assignee: Mobay Chemical Corporation, Pittsburgh, Pa.

[21] Appl. No.: 429,708

[22] Filed: Sep. 30, 1982

[51] Int. Cl.$^3$ .............................................. B05D 3/02
[52] U.S. Cl. ................................ 427/386; 427/388.2; 427/388.3; 427/388.4; 523/402; 523/423; 524/591
[58] Field of Search ............... 523/402, 423; 525/528; 524/591; 427/385.5, 386, 388.2, 388.4, 388.3

[56] References Cited

U.S. PATENT DOCUMENTS

| | | | |
|---|---|---|---|
| 4,048,179 | 9/1977 | Shen et al. | 260/29.4 R |
| 4,073,762 | 2/1978 | Hosoda et al. | 260/29.3 |
| 4,098,933 | 7/1978 | Burkhardt et al. | 427/379 |
| 4,269,748 | 5/1981 | Nachtkamp et al. | 524/591 X |
| 4,278,580 | 7/1981 | Schmölzer et al. | 260/29.2 EP |
| 4,284,544 | 8/1981 | Wegner et al. | 260/29.2 TN |
| 4,292,226 | 9/1981 | Wenzel et al. | 524/591 |
| 4,304,700 | 12/1981 | Shimp et al. | 260/29.2 EP |
| 4,307,004 | 12/1981 | Schuhmacher et al. | 524/591 X |
| 4,315,044 | 2/1982 | Elmore et al. | 427/386 |
| 4,315,840 | 2/1982 | Kempter et al. | 528/45 X |
| 4,410,678 | 10/1983 | Holubka et al. | 525/528 |

FOREIGN PATENT DOCUMENTS 0056167 7/1982 European Pat. Off. .
2708611 5/1978 Fed. Rep. of Germany .

*Primary Examiner*—Thurman K. Page
*Attorney, Agent, or Firm*—Gene Harsh; Joseph C. Gil; Thomas W. Roy

[57] ABSTRACT

The present invention is directed to an aqueously dispersed, heat-curable coating composition comprising
(a) a water-dispersible epoxy resin component containing external and/or chemically incorporated non-ionic emulsifiers and
(b) a water-dispersible, blocked polyisocyanate component containing chemically incorporated anionic hydrophilic groups in a weight ratio of component (a) to component (b) of about 1:10 to 10:1.

The present invention is also directed to a process for producing coated substrates from these compositions and to the coated substrates produced therefrom.

22 Claims, No Drawings

PROCESS FOR COATING AQUEOUS DISPERSION OF EPOXY RESIN AND BLOCKED POLYISOCYANATE CONTAINING CHEMICALLY INCORPORATED ANIONIC HYDROPHILIC GROUPS

BACKGROUND OF THE INVENTION

1. Field of the Invention

The present invention is directed to aqueously dispersed, heat-curable coating compositions containing a water-dispersible epoxy resin component and a water-dispersible blocked polyisocyanate component, to a process for producing coated substrates from these compositions and to the coated substrates produced therefrom.

2. Description of the Prior Art

Epoxy resins which are rendered water-dispersible by external and/or chemically incorporated emulsifiers have recently increased in importance due to the need to eliminate volatile organic solvents from these systems. Water-dispersible epoxy resin compositions containing non-ionic and cationic emulsifiers are disclosed in U.S. Pat. Nos. 4,048,179; 4,073,762; 4,304,700 and 4,315,044. The epoxy resin compositions also conventionally contain nitrogen-containing curing agents such as polyamines, polyamide resins or urea- or melamine-aldehyde resins. Even though these curing agents provide adequate film properties, some of them are potentially physiologically harmful while others must be shielded from the atmosphere or it becomes difficult to cure the compositions in which they are used into coatings.

It has surprisingly been discovered that the problems associated with these known coating compositions may be overcome by using water-dispersible blocked polyisocyanates as curing or cross-linking agents for epoxy resins made water-dispersible by external and/or chemically incorporated non-ionic emulsifiers. Water-dispersible blocked polyisocyanates are known as disclosed by U.S. Pat. Nos. 4,098,933 and 4,284,544; however, their primary utility has been as cross-linkers for aqueous polyurethane dispersions, polyester polyols or polyhydroxy polyacrylates.

It is an object of the present invention to provide aqueously dispersed coating compositions based on epoxy resins and blocked polyisocyanates which are stable in storage, unaffected by the atmosphere and cure under the influence of heat to form cross-linked coatings possessing improved impact resistance.

SUMMARY OF THE INVENTION

The present invention is directed to an aqueously dispersed, heat-curable coating composition comprising (a) a water-dispersible epoxy resin component containing external and/or chemically incorporated non-ionic emulsifiers and (b) a water-dispersible, blocked polyisocyanate component containing chemically incorporated anionic hydrophilic groups in a weight ratio of component (a) to component (b) of about 1:10 to 10:1.

The present invention is also directed to a process for producing coated substrates from these compositions and to the coated substrates produced therefrom.

DETAILED DESCRIPTION OF THE INVENTION

The water-dispersible epoxy resins used in the composition of the present invention have an average molecular weight of about 500 to 20,000 and are prepared from a dihydric phenol and the diglycidyl ether of a dihydric phenol. In addition, an external emulsifier and/or a chemically incorporated emulsifier based on a polyoxyalkylene glycol is used to provide hydrophilicity to the epoxy resin. Both the dihydric phenol and the diglycidyl ether of a dihydric phenol may also contain other substituents such as alkyl, aryl, sulfido, sulfonyl, halo, etc.

Illustrative of suitable dihydric phenols are 2,2-bis(4-hydroxyphenyl)propane, 2,2-bis(3-bromo-4-hydroxyphenyl)propane, 2,2-bis(3-chloro-4-hydroxyphenyl)-propane, bis(4-hydroxyphenyl)methane, bis(4-hydroxyphenyl)sulfone, bis(4-hydroxyphenyl)sulfide, resorcinol, hydroquinone, and the like. The preferred dihydric phenols are 2,2-bis(4-hydroxyphenyl)propane (bisphenol A) and bis(4-hydroxyphenyl)methane for reasons of cost and availability.

The diglycidyl ether derivatives are prepared by the reaction of a dihydric phenol with a halogen-containing epoxide or dihalohydrin in the presence of an alkaline medium. By varying the ratios of the dihydric phenol and epichlorohydrin reactants, different molecular weight products can be obtained as described in U.S. Pat. Nos. 2,582,985; 2,615,007 and 2,633,458.

For purposes of the present invention, optionally at least a portion of the diglycidyl ether of dihydric phenol component can be replaced with a diglycidyl ether of a hydrogenated dihydric phenol derivative. For example, the said diglycidyl ether of dihydric phenol can have up to essentially 100 percent of its weight substituted by a diglycidyl alicyclic ether such as 2,2-bis(4-hydroxycyclohexyl)propane or bis(4-hydroxycyclohexyl)methane.

In order to render the epoxy resins water-dispersible, either a non-ionic external emulsifier is added to the resin and/or a non-ionic emulsifier is chemically incorporated into the epoxy resin. The emulsifiers contain repeating alkylene oxide units, preferably ethylene oxide units, and have average molecular weights between about 400 and 24,000.

Suitable external emulsifiers are disclosed in U.S. Pat. No. 4,073,762 and include those of the alkylaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type. In addition, reaction products of polyethylene glycols with aromatic diglycidyl compounds such as those disclosed in U.S. Pat. No. 3,563,493 may also be used as external emulsifiers. The epoxy resin component may contain from about 1 to 20%, preferably 2 to 15%, by weight of the external emulsifier, based on the weight of the epoxy resin component.

Chemically incorporated non-ionic emulsifiers are based on polyoxyalkylene glycols which are soluble or at least partially soluble in water. Polyoxyalkylene glycols are prepared conveniently by the condensation of an alkylene oxide with a suitable polyhydric alcohol. Illustrative of alkylene oxides are ethylene oxide and propylene oxide and mixtures thereof. Illustrative of polyhydric alcohols are aliphatic alcohols such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, pentaerythritol, sorbitol, 2,2-bis(4-hydroxycyclohexyl)propane, and the like.

Preferred polyoxyalkylene glycols are those prepared by the reaction of ethylene oxide and/or propylene oxide with a dihydric aliphatic alcohol, e.g., ethylene glycol. Illustrative of polyoxyalkylene glycols are commercial Pluronic (BASF-Wyandotte) type products which are block copolymers of ethylene oxide and propylene oxide of about 5000–10,000 molecular weight, containing from about 50 to about 90 weight percent ethylene oxide and about 10 to 50 weight percent propylene oxide.

The polyoxyalkylene glycols may be chemically incorporated through reaction of their hydroxyl groups with the epoxide rings of the epoxy resins as disclosed in U.S. Pat. No. 4,048,179. However, this method is not preferred since it reduces the number of epoxide groups available for cross-linking with the water-dispersible blocked polyisocyanate component of the present invention. Thus, it is preferred to convert the polyoxyalkylene glycol into its diglycidyl ether prior to chemically incorporating it into the epoxy resin. These diglycidyl ethers may be conveniently prepared by reacting epichlorohydrin with a selected polyoxyalkylene glycol in a molar proportion which provides substantially a diglycidyl ether reaction product. The epoxy resins may contain from about 1 to 20%, preferably from about 2 to 15%, by weight of chemically incorporated polyoxyalkylene glycols or their diglycidyl ethers.

A preferred epoxy resin is the addition product of reactants comprising (i) about 50 to 90 parts by weight of the diglycidyl ether of a dihydric phenol, (ii) about 8 to 35 parts by weight of a dihydric phenol and (iii) about 2 to 15 parts by weight of the diglycidyl ether of a polyoxyalkylene glycol, wherein the average molecular weight of the epoxy resin is about 500 to 20,000.

The stable aqueous epoxy resin dispersions used according to the present invention may also contain a water-immiscible $C_8$–$C_{20}$ aliphatic monoepoxide reactive diluent component. The said monoepoxide component can contain alicyclic and aromatic structures, as well as halogen, sulfur, phosphorus, and other such heteroatoms.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is the glycidyl ether of monohydric $C_8$–$C_{17}$ aliphatic alcohols.

The presence of a water-immiscible $C_8$–$C_{20}$ aliphatic monoepoxide reactive diluent in an aqueous epoxy resin dispersion has a significant beneficial effect on the properties of the aqueous dispersion. The said water-immiscible reactive diluent appears to function by coating the particles of epoxy resin solids and thereby providing the aqueous dispersion with improved shear, freeze-thaw resistance, shelf viscosity stability, and paint gloss.

Also, since the reactive diluent is epoxy functional, it may become incorporated into the film-forming substrate during the subsequent heat curing of the aqueously dispersed composition after it has been blended with the blocked polyisocyanate and coated on a substrate. The total quantity of reactive diluent contributes to the calculated proportion of non-volatiles in the dispersion composition.

The water-dispersible, blocked polyisocyanates used in conjunction with the water-dispersible epoxy resins in the compositions of the present invention preferably contain an average of about 1–5, preferably about 2–5, blocked isocyanate groups per molecule and may be prepared from virtually any organic polyisocyanate, preferably from polyisocyanates containing 2–4 isocyanate groups. Especially preferred are polyisocyanates having aliphatically- and/or cycloaliphatically-bound isocyanate groups, although polyisocyanates having aromatically-bound isocyanate groups are not excluded and may be used.

The polyisocyanates used for preparing the water-dispersible blocked polyisocyanates may be monomeric in nature or adducts prepared from organic diisocyanates and containing biuret, allophanate or urethane groups or isocyanurate rings. Suitable polyisocyanates which may be used as such or as intermediates for preparing polyisocyanate adducts include ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and 1,4-diisocyanate and mixtures of these isomers, 1-isocyanato-2-isocyanatomethyl cyclopentane, 1-isocyanato-3,3,5-trimethyl-5-isocyanatomethyl cyclohexane, 2,4- and 2,6-hexahydro tolylene diisocyanate and mixtures of these isomers, 2,4′- and/or 4,4′-dicyclohexyl methane diisocyanate, 1,3- and 1,4-phenylene diisocyanate, 2,4- and 2,6-tolylene diisocyanate and mixtures of these isomers, diphenyl methane-2,4′- and/or 4,4′-diisocyanate, naphthalene-1,5-diisocyanate, triphenyl methane-4,4′,4″-triisocyanate, polyphenyl polymethylene polyisocyanates of the type obtained by condensing aniline with formaldehyde followed by phosgenation, and mixtures of the above-mentioned polyisocyanates.

Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714 or 4,220,749 by using coreactants such as water, tertiary alcohols, primary and secondary monoamines, and primary and/or secondary diamines. The preferred diisocyanate to be used in these processes is 1,6-hexamethylene diisocyanate.

Polyisocyanate adducts containing allophanate groups may be prepared by reacting the previously mentioned diisocyanates according to the processes disclosed in U.S. Pat. Nos. 3,769,318 and 4,160,080, British Pat. No. 994,890 and German Offenlegungsschrift No. 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift No. 1,150,080; German Offenlegungsschrift No. 2,325,826; and British Pat. No. 1,465,812. The preferred diisocyanates to be used are 2,4-tolylene diisocyanate, 2,6-tolylene diisocyanate mixtures of these isomers, 1,6-hexamethylene diisocyanate isophorone diisocyanate and mixtures of the latter two diisocyanates.

Polyisocyanate adducts containing urea or preferably urethane groups and based on the reaction product of the previously mentioned diisocyanates and compounds containing 2 or more isocyanate-reactive hydrogens may be prepared according to the process disclosed in U.S. Pat. No. 3,183,112. In preparing polyisocyanate adducts the average isocyanate functionality is determined from the functionality of the compounds containing isocyanate-reactive hydrogens. For example, when an excess of a diisocyanate is reacted with a diol, a polyisocyanate with a functionality of 2 will be produced, while a triol co-reactant will result in a polyisocyanate functionality of 3. By using mixtures of compounds containing isocyanate-reactive hydrogens, various functionalities can be obtained. The preferred isocyanate-reactive hydrogens are provided by hydroxyl groups although amino groups are not excluded. Suitable compounds containing isocyanate-reactive hydrogens are disclosed in U.S. Pat. No. 3,183,112, incorporated herein by reference, and include ethylene glycol, 1,2- and 1,3-propylene glycol, 1,3- and 1,4-butane diol, 1,6-hexanediol, 2,2-dimethyl-1,3-propylene glycol, glycerine, trimethylol propane, ethylene diamine, diethylene triamine and triethylene tetraamine. 1,3- and 1,4-butane diol, trimethylolpropane and mixtures thereof are particularly preferred. Preferred diisocyanates are 2,4-tolylene diisocyanate, 2,6-tolylene diisocyanate, mixtures of these isomers, 1,6-hexamethylene diisocyanate and isophorone diisocyanate.

The blocking agents which are suitable for preparing the blocked polyisocyanates are compounds with preferably one isocyanate-reactive group which enter into an addition reaction with an isocyanate group at temperatures above about 50° C., preferably at temperatures in the range of from about 60° C. to 100° C., and wherein the resulting addition product, in admixture with the epoxy resins, reacts with hydroxyl groups to form urethanes at temperatures in the range of about 100° C. to 250° C., the reaction being accompanied by liberation of the blocking agent. Suitable blocking agents of this type are, for example, secondary or tertiary alcohols, such as isopropanol or tert-butanol; C-H-acid compounds, such as malonic acid dialkyl esters, acetyl acetone or acetoacetic acid alkyl esters; oximes, such as formaldoxime, acetaldoxime, methyl ethyl ketoxime, cyclohexanone oxime, acetophenone oxime, benzophenone oxime or diethyl glyoxime; lactams, such as ε-caprolactam, δ-valerolactam; phenols, such as phenol, cresol or nonyl phenol; N-alkyl amides, such as N-methyl acetamide; imides, such as phthalimide; imidazole; or alkali metal bisulphites.

In order to make the polyisocyanates water-dispersible, it is necessary to chemically incorporate a hydrophilic group, i.e., an anionic group or a potential anionic group, into the polyisocyanate component. Suitable hydrophilic components contain at least one isocyanate-reactive hydrogen and at least one hydrophilic group or potential hydrophilic group. Examples include aliphatic hydroxy carboxylic acids, aliphatic or aromatic aminocarboxylic acids with primary or secondary amino groups, aliphatic hydroxy sulfonic acids and aliphatic or aromatic aminosulfonic acids with primary or secondary amino groups. These acids preferably have molecular weights below about 300. It should be emphasized that the acid hydrogens are not considered to be isocyanate-reactive hydrogens due to their sluggish reactivity with isocyanates.

The preferred anionic groups for use in the present invention are carboxylate groups and these groups may be introduced by using hydroxy-carboxylic acids of the general formula:

$$(HO)_xQ(COOH)_y$$

wherein

Q represents a straight or branched, hydrocarbon radical containing 1 to 12 carbon atoms, and x and y represent values from 1 to 3. Examples of these hydroxy-carboxylic acids include citric acid and tartaric acid.

The preferred acids are those of the above-mentioned formula wherein $x=2$ and $y=1$. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula;

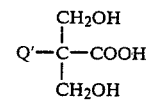

wherein Q' is hydrogen or an alkyl group containing 1 to 8 carbon atoms. The most preferred compound is α,α-dimethylol propionic acid, i.e., when Q' is methyl in the above formula.

In order to prepare water-dispersible polyisocyanates containing about 2-5 blocked isocyanates per molecule from a difunctional polyisocyanate starting component such as a diisocyanate, it is necessary to use hydrophilic components containing at least two isocyanate-reactive hydrogens. For example, the use of a dihydroxy alkanoic acid to provide hydrophilicity results in the linking of 2 diisocyanate molecules and maintains the isocyanate functionality of the molecule at 2. To the contrary, the reaction of a diisocyanate with a monohydroxy alkanoic acid produces a monoisocyanate. While a small portion of monoisocyanates is acceptable since they may function as cross-linking agents as explained in more detail below, in order to provide higher degrees of cross-linking the isocyanate functionality should be maintained at between about 2 and 5.

The above-mentioned acid groups may be converted into hydrophilic anionic groups by treatment with a neutralizing agent such as an alkali metal salt or a primary, secondary or preferably tertiary amine in an amount sufficient to render the blocked polyisocyanates water-dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile amines since they lead to reduced water resistance in the coatings produced from the water-dispersible compositions of the present invention.

Examples of suitable amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethylethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone. The most preferred tertiary amines are those which do not contain active hydrogen(s) as determined by the Zerewitinoff test since they are capable of reacting with isocyanate groups during the curing of the compositions of the present invention.

It is a preferred embodiment of the present invention that the tertiary amines be volatile so that when the water-dispersible coating composition of the subject application cures at elevated temperatures, the tertiary amine volatilizes, preferably at a lower temperature than the unblocking temperature of the blocked polyisocyanate, and is removed from the coated substrate. This frees the carboxylate or sulfonate group to react with the epoxide ring of the epoxy resin component thus generating an additional hydroxyl group for subsequent cross-linking with an unblocked isocyanate group.

In order to prepare the water-dispersible blocked polyisocyanate the starting polyisocyanate is preferably reacted at a temperature above about 50° C., preferably at a temperature in the range of from about 60° to 100° C., with a quantity of blocking agent which corresponds to a ratio of NCO-groups to NCO-reactive groups of from about 1:0.3 to 1:0.95, preferably from about 1:0.50 to 1:0.85. However, it is also possible in principle to use an excess of blocking agent and to stop the blocking reaction at the required degree of blocking of from about 30 to 95%, preferably from about 50 to 85%, of the isocyanate groups originally present, by cooling to room temperature. In such a case, the excess blocking agent is generally removed by distillation on completion of the reaction of the partially blocked isocyanate with the hydrophilic components. The blocking reaction is usually carried out in the absence of a solvent. It may be advisable to carry out the blocking reaction in the presence of a catalyst, depending upon the type of blocking agent used. In cases where alcohols are used as blocking agent, it is advisable to use a metal catalyst, for example dibutyl tin dilaurate. In cases where blocking agents containing activated methylene groups are used, it is advisable to use basic catalysts, such as diazabicyclooctane, triethyl amine, alkali metal alcoholates or alkali metal phenolates, such as sodium phenolate. The catalysts are used in quantities of from about 0.05 to 0.5%, by weight, based on the reaction mixture as a whole.

The free isocyanate groups still present on completion of the blocking reaction are reacted with the hydrophilic components in a second reaction stage. The hydrophilic components are preferably used in such a quantity that there is at least one NCO—reactive group of the hydrophilic components for every isocyanate group still present. Reaction of the partially blocked polyisocyanate with the hydrophilic components may be carried out in the presence or even in the absence of solvents. Suitable solvents include the water-miscible solvents normally used in polyurethane chemistry such as esters, ketones, halogenated hydrocarbons, alkanes and arenes. Low boiling solvents include those boiling at temperatures in the range of from about 40° to 90° C. such as acetone and methyl ethyl ketone. In addition, higher boiling solvents such as N-methyl pyrrolidinone, dimethyl formamide, dimethyl sulfoxide and ethylene glycol mono(-methyl, -ethyl or -butyl) ether acetate may be utilized.

In one embodiment of the process according to the invention, for example, solutions of the partially blocked polyisocyanate and the reaction components containing the hydrophilic group are combined at room temperature or moderately elevated temperature (the hydrophilic component may also be added as such to the solution of the partially blocked polyisocyanate), and kept at a moderately elevated temperature, for example, at a temperature in the range of from about 20° to 90° C., until the addition reaction is over. On completion of the reaction, the dissolved end product may either be obtained as such by distilling off the solvent (if a low boiling solvent is present) and any unreacted blocking agent still present, or, if there is no need to remove excess blocking agent, the end product may be converted into an aqueous dispersion by stirring the solution into water and subsequently distilling off the solvent (if a low boiling solvent is present). When higher boiling solvents are used, they are maintained in the end product.

The acid groups may be converted into hydrophilic anionic groups by treatment with the volatile amine either before, during or after the reaction of the hydrophilic component with the blocked polyisocyanate. However, it is preferred to neutralize the acid groups after the reaction of the blocked polyisocyanate with the hydrophilic component and prior to dispersing it in water.

The aqueously dispersed coating compositions may be prepared from the epoxy resin and the blocked polyisocyanate by mixing each component, optionally in the presence of an organic solvent, with water followed by mixing the dispersions together or by mixing one component with water followed by adding the remaining component. The coating composition should be formulated at about 5 to 80%, preferably 25 to 70% solids. The weight ratio of the blocked polyisocyanate component to the epoxy resin component should be about 1:10 to 10:1, preferably about 1:2 to 2:1.

The aqueously dispersed coating composition of the present invention may further contain additives conventionally employed in coating technology, such as organic pigments, inorganic pigments, surfactants, thickeners, and the like.

In normal usage after the aqueously dispersed composition is prepared it is coated on a substrate by brush, roller, spray, dip, doctor blade or similar application means.

The present invention provides aqueously dispersed compositions which have properties suitable for use as a one-package coating system in which the blocked polyisocyanate component is substantially unreactive with the epoxy resin component at room temperature. In this type of system, cross-linking is accomplished by baking an applied coating at an elevated temperature. For example, the present invention one-package coating system may be cured by heating a coated article at a temperature between about 100°–250° C., preferably 100°–200° C., for a period of time between about 5 minutes and two hours which is sufficient to effect a thermosetting cure.

The invention is further illustrated, but is not intended to be limited by the following examples in which all parts and percentages are by weight unless otherwise specified.

EXAMPLE 1

Into a one liter, three neck flask equipped with stirrer, thermometer, and condenser (fitted with drying tube filled with anhydrous calcium sulfate) was charged 360.0 g of the biuret of 1,6-hexamethylene diisocyanate (23.3% NCO content, Desmodur L-2291A, Mobay Chemical Corporation). The material was stirred and to it was slowly added 130.6 g methyl ethyl ketoxime such that the temperature was kept below 90° C. The mixture was stirred and the temperature was maintained at 90° C. for three hours. Powdered α,α-dimethylol propionic acid (33.5 g) and N-methyl pyrrolidinone (184.9 g) were added and the mixture was stirred for three hours while maintaining the temperature at 90° C. An infrared spectrum of the product showed that no residual isocyanate remained at this time. The mixture was cooled to 68° C. and then 24.0 g triethylamine and 50.0 g N-methylpyrrolidinone were added. Stirring was maintained for an additional half hour. The resulting product had a viscosity of 11,800 mPa.s at 23° C. and was readily dispersed in an equal portion of distilled water at room temperature.

EXAMPLE 2

Into a one liter, three neck flask equipped with stirrer, thermometer, and condenser (fitted with drying tube filled with anhydrous calcium sulfate) was charged 420.0 g of a 90% solution of the trimer of 1,6-hexamethylene diisocyanate in ethylene glycol monoethyl ether acetate (20.0% NCO content and prepared in accordance with Example 1 of U.S. Pat. No. 4,324,879). The material was stirred and to it was slowly added 130.6 g methyl ethyl ketoxime such that the temperature was kept below 90° C. The mixture was stirred and the temperature was maintained at 90° C. for three hours. Powdered α,α-dimethylol propionic acid (33.5 g) and N-methyl pyrrolidinone (150.6 g) were added and the mixture was stirred for three hours while maintaining the temperature at 90° C. An infrared spectrum of the product showed that no residual isocyanate remained at this time. The mixture was cooled to 68° C. and then 24.0 g triethylamine and 50.0 g N-methyl pyrrolidinone were added. Stirring was maintained for an additional half hour. The resulting product had a viscosity of 11,200 mPa.s at 23° C. and was readily dispersed in an equal portion of distilled water at room temperature.

EXAMPLE 3

A 55.6 g portion of CMD-35201 (non-ionic bisphenol A epoxy resin dispersion, 60% solids in water, Celanese Plastics & Specialties Company) was further diluted with 10.0 g distilled water. Twenty drops of a 5% aqueous solution of FC-430 (fluorocarbon surfactant, 3M Company) were stirred into the water dispersed epoxy. Drawdowns (10 mil wet film thickness) were made on Bonderite ® 100 steel panels* (6"×9", zinc phosphate treatment). Most of the solvent was allowed to evaporate for 30 minutes at ambient temperature and room humidity. The film was baked for 20 minutes at 140° C. A clear, defect-free film was obtained. Properties of the film are listed in the Table.

*a registered trademark of Oxy Metal Industries Corporation

EXAMPLE 4

Equal portions of distilled water and the product described in Example 1 were admixed. A 55.6 g portion of the epoxy resin dispersion used in Example 3 was mixed with 111.2 g of the water dispersed blocked polyisocyanate. Twenty five drops of a 5% aqueous solution of FC-430 (fluorocarbon surfactant, 3M Company) were stirred into the mixture. Drawdowns 10 mil wet film thickness) were made on Bonderite ® 100 steel panels (6"×9" zinc phosphate treatment). Most of the solvent was allowed to evaporate for 30 minutes at ambient temperature and room humidity. The film was baked for 20 minutes at 140° C. A clear, defect-free film was obtained. Properties of the film are listed in the Table.

EXAMPLE 5

Equal portions of distilled water and the product described in Example 2 were admixed. A 55.6 g portion of the epoxy resin dispersion used in Example 3 was mixed with 107.6 g of the water dispersed blocked polyisocyanate. Twenty five drops of a 5% aqueous solution of FC-430 (fluorocarbon surfactant, 3M Company) were stirred into the mixture. Drawdowns (10 mil wet film thickness) were made on Bonderite ® 100 steel panels (6"×9", zinc phosphate treatment). Most of the solvent was allowed to evaporate for 30 minutes at ambient temperature and room humidity. The film was baked for 20 minutes at 140° C. A clear, defect-free film was obtained. Properties of the film are listed in the Table.

EXAMPLE 6

A 55.6 g portion of the epoxy resin dispersion used in Example 3 was further diluted with 10.0 g distilled water. Ethylenediamine (3.4 g) was mixed into this solution. Twenty drops of a 5% aqueous solution of FC-430 (fluorocarbon surfactant, 3M Company) were stirred into the mixtue. Drawdowns (10 mil wet film thickness) were made on Bonderite ® 100 steel panels (6"×9", zinc phosphate treatment). The solvent was allowed to evaporate for 30 minutes at ambient temperature and room humidity. The film was baked for 20 minutes at 140° C. A yellow, cloudy film with severe bubbling was obtained. It was not further tested.

TABLE

| Example # | Pencil Hardness | 90° Bend | Resistance to 100 Double MEK rubs | Resistance to 1 hr spot Test (room temperature) | |
|---|---|---|---|---|---|
| | | | | Water | 50/50 water/isopropyl alcohol |
| 3 | 6B | no effect | completely removed | no effect | severe whitening |
| 4 | 4H—6H | whitens | no effect | slight whitening | slight whitening[a] |
| 5 | 4H—6H | whitens | no effect | slight whitening | very slight whitening[a] |

[a] Recovers within 24 hr. period

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueously dispersed, heat-curable coating composition comprising
(a) a water-dispersible epoxy resin component containing external and/or chemically incorporated non-ionic emulsifiers and
(b) a water-dispersible, blocked polyisocyanate component containing chemically incorporated anionic hydrophilic groups in a weight ratio of component (a) to component (b) of about 1:10 to 10:1.

2. The composition of claim 1 wherein component (a) is the addition product of reactants comprising a dihydric phenol and the diglycidyl ether of a dihydric phenol.

3. The composition of claim 2 wherein at least a portion of said diglycidyl ether of a dihydric phenol is replaced with the diglycidyl ether of a hydrogenated dihydric phenol.

4. The composition of claim 2 wherein said diglycidyl ether of a dihydric phenol comprises the diglycidyl ether of bisphenol A.

5. The composition of claim 2 wherein said dihydric phenol comprises bisphenol A.

6. The composition of claim 1 wherein said epoxy resin component contains a chemically incorporated non-ionic emulsifier.

7. The composition of claim 6 wherein said chemically incorporated non-ionic emulsifier is the diglycidyl ether of a polyoxyalkylene glycol based on ethylene oxide and optionally propylene oxide.

8. The composition of claim 1 wherein said epoxy resin component has an average molecular weight of about 500 to 20,000 and is the addition product of reactants comprising (i) from about 50 to 90 parts by weight of the diglycidyl ether of a dihydric phenol, (ii) from about 8 to 35 parts by weight of a dihydric phenol and (iii) from about 2 to 15 parts by weight of the diglycidyl ether of a polyoxyalkylene glycol based on ethylene oxide and optionally propylene oxide.

9. The composition of claim 1 or 8 wherein component (b) comprises the reaction product of
(i) a polyisocyanate containing 2 to 4 isocyanate groups,
(ii) a blocking agent for isocyanate groups in an amount sufficient to block about 30 to 95% of the isocyanate groups of component (i) and
(iii) a compound containing at least one potential anionic group and at least one isocyanate-reactive group in an amount sufficient to react with the remaining isocyanate groups of component (i), the potential anionic groups being treated with a neutralizing agent in an amount sufficient to render component (b) water-dispersible.

10. The composition of claim 9 wherein component (i) is a biuret-containing polyisocyanate or a polyisocyanate containing isocyanurate rings.

11. The composition of claim 10 wherein component (i) is prepared from 1,6-hexamethylene diisocyanate.

12. The composition of claim 9 wherein said compound is a dihydroxy alkanoic acid represented by the structural formula

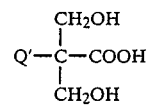

wherein Q' is hydrogen or an alkyl group containing 1 to 8 carbon atoms.

13. The composition of claim 12 wherein Q' is methyl.

14. The composition of claim 9 wherein said anionic group is formed by neutralizing a sulfonic or carboxylic acid group with a tertiary amine.

15. The composition of claim 14 wherein said tertiary amine is a trialkyl amine.

16. The composition of claim 15 wherein said trialkyl amine is triethylamine.

17. The composition of claim 13 wherein said alkanoic dihydroxy acid is neutralized with triethylamine.

18. The composition of claim 9 wherein said compound is a hydroxyl-group containing sulfonic acid.

19. The composition of claim 9 wherein component (ii) is methyl ethyl ketoxime.

20. An aqueously dispersed, heat-curable coating composition comprising
(a) a water-dispersible epoxy resin component having an average molecular weight of about 500 to 20,000 and is the addition product of reactants comprising
(i) from about 50 to 90 parts by weight of the diglycidyl ether of a dihydric phenol,
(ii) from about 8 to 35 parts by weight of a dihydric phenol and
(iii) from about 2 to 15 parts of a chemically incorporated emulsifier; and
(b) a water-dispersible, blocked polyisocyanate component comprising the reaction product of
(i) a polyisocyanate containing 2 to 4 isocyanate groups,
(ii) a blocking agent for isocyanate groups in an amount sufficient to block about 30 to 95% of the isocyanate groups of component (i) and
(iii) a compound containing at least one potential anionic groups and at least one isocyanate-reactive group in an amount sufficient to react with the remaining isocyanate groups of component (i), the potential ionic groups being treated with a neutralizing agent in an amount sufficient to render component (b) water-dispersible.

21. A process for forming a coating which comprises
(a) coating a substrate with the coating composition of claim 1 or 20 and
(b) heating said coated substrate to a temperature between about 100° C. and 250° C. for a time sufficient to cure said coating composition.

22. The coated substrate produced according to claim 21.

* * * * *